(No Model.) 8 Sheets—Sheet 1.
T. CARNEY.
CASH REGISTER AND INDICATOR.

No. 490,898. Patented Jan. 31, 1893.

Fig. 1.

Witnesses:
Wm. F. Henning
Lute B. Alter

Inventor:
Thomas Carney
By Edward Rector
his Attorney (No Model.) 8 Sheets—Sheet 2.

T. CARNEY.
CASH REGISTER AND INDICATOR.

No. 490,898. Patented Jan. 31, 1893.

(No Model.) 8 Sheets—Sheet 3.
T. CARNEY.
CASH REGISTER AND INDICATOR.

No. 490,898. Patented Jan. 31, 1893.

Fig. 3.

(No Model.) 8 Sheets—Sheet 4.
T. CARNEY.
CASH REGISTER AND INDICATOR.

No. 490,898. Patented Jan. 31, 1893.

(No Model.) 8 Sheets—Sheet 6.

T. CARNEY.
CASH REGISTER AND INDICATOR.

No. 490,898. Patented Jan. 31, 1893.

Witnesses: Inventor:
Wm. F. Henning Thomas Carney
Lute B. Kerr By Edward Rector
his Attorney (No Model.) 8 Sheets—Sheet 7.

T. CARNEY.
CASH REGISTER AND INDICATOR.

No. 490,898. Patented Jan. 31, 1893.

(No Model.) 8 Sheets—Sheet 8.
T. CARNEY.
CASH REGISTER AND INDICATOR.

No. 490,898. Patented Jan. 31, 1893.

UNITED STATES PATENT OFFICE.

THOMAS CARNEY, OF DAYTON, OHIO, ASSIGNOR TO THE NATIONAL CASH REGISTER COMPANY, OF SAME PLACE.

CASH REGISTER AND INDICATOR.

SPECIFICATION forming part of Letters Patent No. 490,898, dated January 31, 1893.

Application filed May 24, 1892. Serial No. 434,126. (No model.)

*To all whom it may concern:*

Be it known that I, THOMAS CARNEY, a citizen of the United States, residing at Dayton, in the county of Montgomery and State of Ohio, have invented certain new and useful Improvements in Cash Registers and Indicators, of which the following is a description, reference being had to the accompanying drawings, forming part of this specification.

My invention relates to that class of machines which employ a series of operating keys representing different values, and indicating, registering and printing mechanisms co-operating therewith, by which the values of the operated keys are indicated, registered and printed upon a paper strip or ticket, or both.

My improvements relate more particularly to the registering and printing mechanisms, and consist in novel constructions, combinations and modes of operation of the various parts, all as will be hereinafter set forth and specifically pointed out in the claims.

In the accompanying drawings Fig. 8 a vertical section on the line 8—8 of Fig. 3.

The same letters of reference are used to indicate identical parts in all the figures.

The operating keys of the machine consist of levers A strung on a horizontal shaft B extending across the machine just below and in front of its middle portion and mounted at its opposite ends in the side frames. The front ends of these levers extend out through slots in the casing and are provided with the usual finger buttons bearing numbers representing the values of the respective keys. The ends of the alternate keys are curved upward, so that the finger buttons are arranged in two banks or rows. Coiled springs C confined in vertical housings beneath the levers A, in front of their pivotal shaft B, bear against the under sides of said levers and press their front ends upward and yieldingly hold them in normal position against the cross plate D of the framework.

Figure 1:
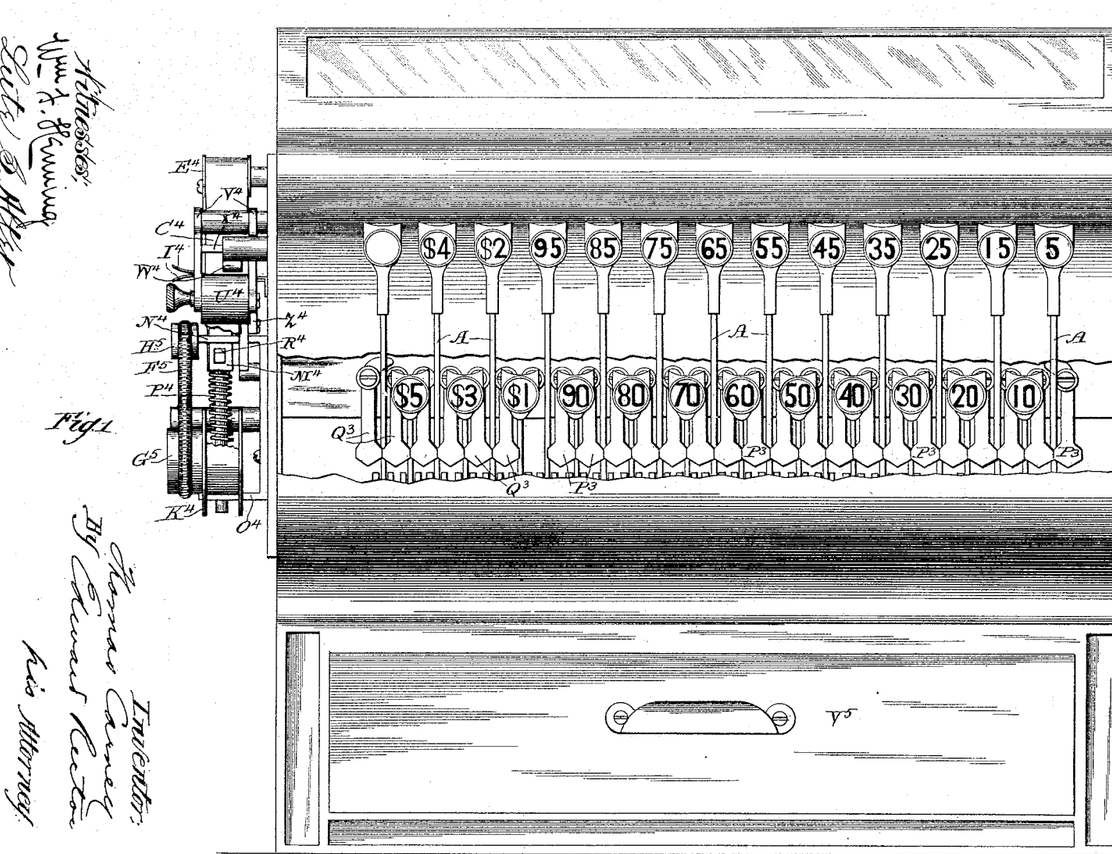
Figure 1 represents a front elevation of my improved machine, with a portion of the casing broken away.

In the machine illustrated in the drawings there are twenty-five keys, the nineteen on the right representing cents in multiples of five from 5 to 95, as seen in Fig. 1, the next five representing dollars, from 1 to 5, and the last key being a blank one, to be used for any special purpose desired. The rear end of the key levers A are widened out into plates E.

Loosely hung at their forward ends upon the shaft B, one beside each of the levers A, are a series of rearwardly extending arms or levers F, whose rear ends rest upon a cross plate G of the framework. Upon the left hand side of each plate E, near its lower end, is a pin H, which projects beneath the lever F adjacent to such plate. When the front ends of the key levers A are pulled downward these pins H will engage the under sides of the levers F and lift their rear ends, the lost motion between said pins and levers F causing a long stroke of the levers A to produce a comparatively short stroke of the levers F. The rear ends of the levers F project through and are guided in their vertical play by slots in a plate I extending transversely across the rear side of the machine and fastened at its lower edge to the cross bar G and at its upper edge to a second cross bar of the framework.

Figure 2:
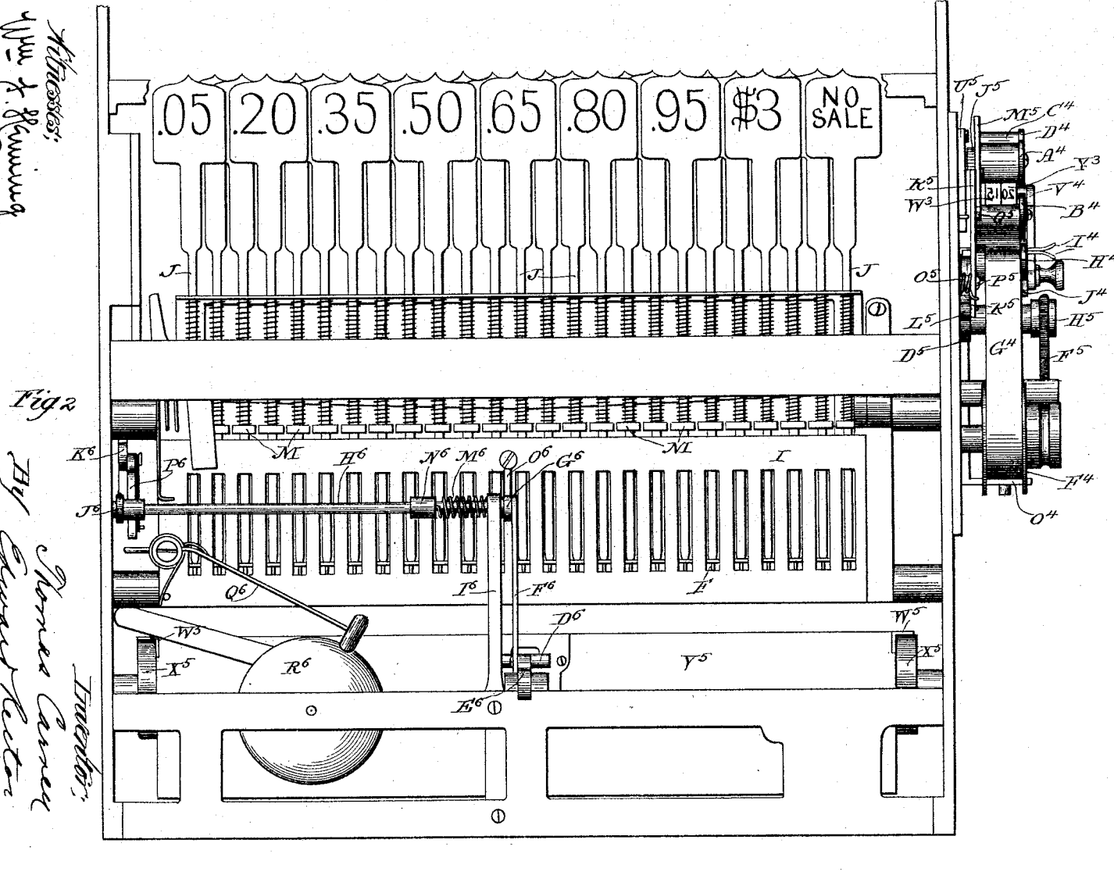
Fig. 2 a rear elevation thereof, with the casing removed.

Resting upon the rear ends of the levers F are the usual vertical rods J carrying at their upper ends indicating tablets bearing numbers corresponding to those upon the respective keys, as seen in Fig. 2, and adapted to be lifted into view at windows extending across the front and rear sides of the casing at its upper end, the former of which windows, K, is shown in Fig. 1. These indicators are temporarily held in view, when lifted by the operations of the keys, by a supporting bar L which co-operates with beveled collars M fast on the rods J, in the usual well known manner.

Figure 3:
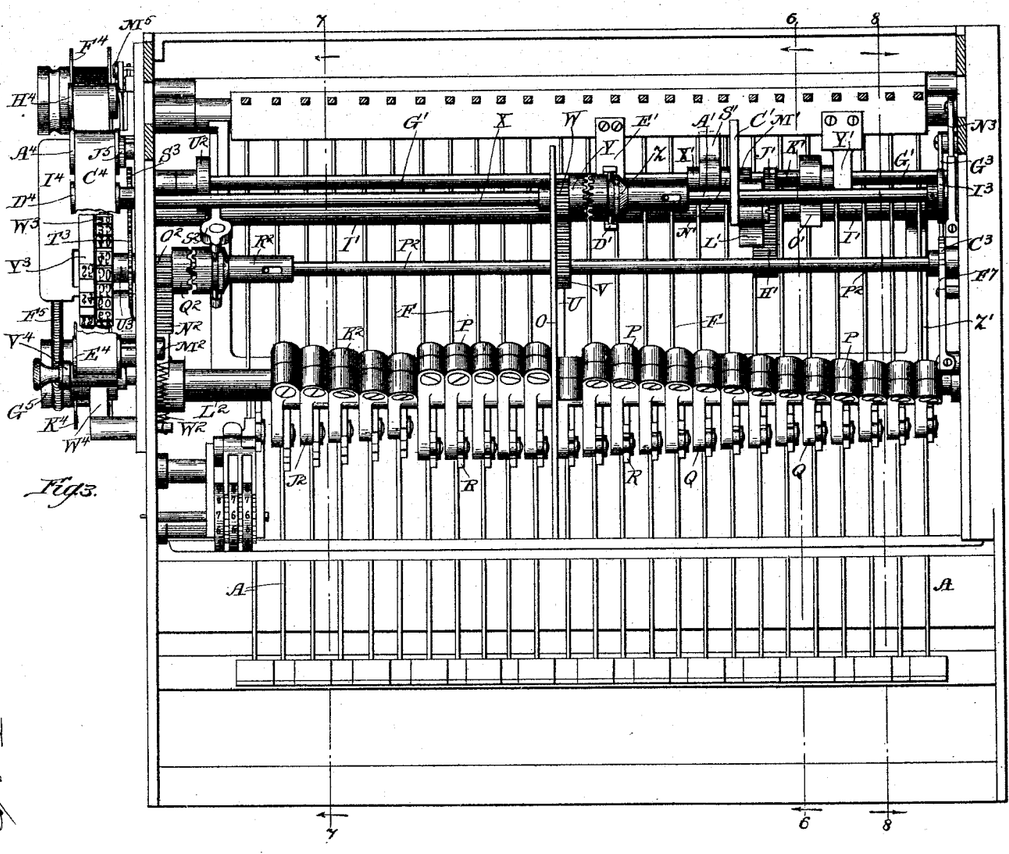
Fig. 3 a top plan view with the upper ends of the tablet rods cut off and with the upper rear corner of the framework cut away on the line 3—3 of Fig. 6.
Figures 6, 13, 14:
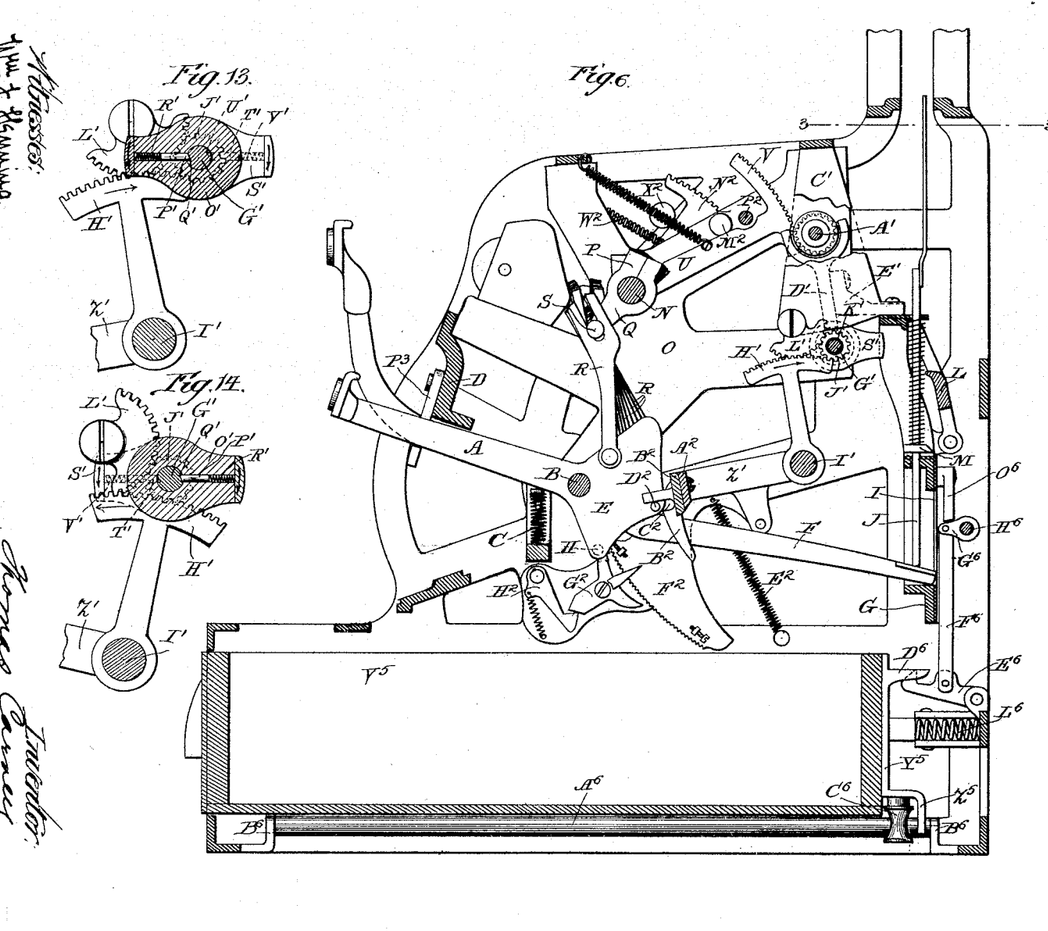
Fig. 6 a vertical section on the line 6—6 of Fig. 3.
Figs. 13 and 14, Sheet 6, enlarged details of the devices for imparting rotary motion to the revoluble shaft from the vibrating frame.

Extending transversely across the machine a short distance above its middle is a rock shaft N journaled at its opposite ends in bearings on the side plates of the framework and having also a bearing near its middle in a vertical plate O, Figs. 3 and 6, supported in the framework of the machine. Clamped fast upon this shaft are a series of split hubs P, one approximately in line with each of the nineteen key levers A on the right. These hubs are provided with integral downwardly and forwardly extending arms Q of graduated lengths, increasing from right to left, as seen in Fig. 3.

The plates E of the key levers are connected with the respective arms Q by means of links R pivoted at their lower ends to the plates E and provided with forked upper ends embracing pins or studs upon the sides of the arms Q, said studs preferably carrying friction collars. The lower ends of the links R are pivoted to the different plates E at varying distances from the fulcrum shaft B of such levers, which, together with the differences in the lengths of the arms Q, causes the full strokes of the different key levers to rock the shaft N different degrees, proportionate to the amounts represented by the respective levers. Thus, the lever shown in the view in Fig. 8 is the second one from the extreme right hand side of the machine and represents ten cents. The lower end of the link R is pivoted to the plate E of this lever quite near the shaft B, so that a full stroke of the lever will lift the link R but a short distance and rock the shaft N slightly. On the other hand the near one of the two keys shown in Fig. 6 is the sixth key from the right, representing thirty cents, and the link R corresponding to this lever is pivoted to its plate E at a considerable distance from the fulcrum shaft B, so that the full stroke of this key lever will rock the shaft N a proportionately greater degree than the lever shown in Fig. 8.

The adjustment of the parts, by means of the different positions of the lower ends of the links R in relation to the shaft B, and the different positions of their upper ends in relation to the shaft N, is such that the right hand one of the nineteen keys representing cents will rock the shaft N a unit of distance, and each succeeding key toward the left will rock it an additional unit of distance until the nineteenth key is reached, which will rock it nineteen times as far as the first key.

Fast upon the shaft N immediately to the right of the plate O of the framework is an arm U, Figs. 3 and 6, which carries on its rear end a segmental rack V which meshes with a pinion W fast upon the right hand end of a shaft X journaled at its left hand end in the side frame of the machine and at its right hand end in the middle plate O thereof, and projecting through said plate to the right thereof. The pinion W has fast upon its right side a clutch member Y adapted to co-operate with a sliding clutch member Z mounted upon a rotary shaft A' having a slot and pin connection therewith so that the clutch will turn with the shaft as well as slide upon it. A coiled spring interposed between the two clutch members yieldingly presses them apart. The shaft A' is journaled at its right hand end in the side frame of the machine, projecting through the same and having fast upon it, outside the frame, the primary wheel B' of a train of registering wheels. Its left hand end is supported and has its bearing in a vertical plate C' secured upon the framework, Fig. 6. The adjacent ends of the shafts X and A' are confined in the bore of the sliding clutch Z. The sliding clutch Z is slid to the left and engaged with the clutch Y upon the pinion W at the beginning of the positive strokes of the key levers, and slid to the right again at the end of such strokes, by means hereinafter described, so that during the positive strokes of the keys the pinion W will be locked to the shaft A' and turn the registering wheel B' with it.

The adjustment of the parts is such that the full positive stroke of any key lever will cause the rack V to turn the pinion W and registering wheel just far enough to add upon the latter the value of the operated key, said wheel being provided around its edge with a series of nineteen numbers, in multiples of five, from 5 to 95, with a cipher interposed between the 95 and 5. The clutch Z is slid to the left at the beginning of the positive strokes of the keys by means of a shifter D' pivoted near its middle to a bracket E' upon the framework, Figs. 6 and 10. The upper end of this shifter is forked and provided with pins which fit in a circumferential groove in the clutch member Z. The lower end of the shifter co-operates with a cam F' fast on the revoluble shaft G', Fig. 3. This shaft G' extends entirely across the machine and is journaled at its opposite ends in the side frames thereof. The shaft G' is actuated by a reciprocating rack H' carried by a rock shaft I', the reciprocating movement of the rack being converted into rotary motion in the shaft by means of the devices to be now described, reference being had to Figs. 3, 13 and 14. The rack H' meshes with a pinion J' carried by a sleeve K' loose upon the shaft G', and also with a segmental rack L' pivoted to the side of the plate C' of the framework. This second rack meshes with a second pinion M' carried by a second sleeve N' also loose upon the shaft G', Fig. 3. It results from this arrangement of the parts that the two sleeves and pinions will be turned in opposite directions by the movements of the rack H'. Carried in a housing O' fast upon or formed integral with the sleeve K' is a pawl P', Figs. 13 and 14, adapted to engage a notch Q' cut in the shaft G', a spring R' confined behind the pawl operating to press it against the shaft. The sleeve N' also has fast upon it a housing S' containing a pawl T' adapted to engage a notch U' cut in the shaft G', a spring V' pressing the pawl against the shaft. The sleeves K' N' are held in position upon the shaft G' by a collar X' at the left and a bracket Y' at the right.

With the parts in the position shown in Fig. 13, with the pawls P' and T' engaged with their respective notches, the operation of the parts is as follows: When the rack H' is given a full stroke in the direction of the arrow it will give the sleeves K' N' each a half revolution, in opposite directions, and bring them to the position shown in Fig. 14. During these movements the pawl P' will carry the shaft G' with it, thereby giving the shaft a half revolution. At the same time the pawl T' will slip out of the notch U' with which it was engaged, and travel idly backward over the shaft and re-engage said notch at the opposite side thereof. When the rack H' is now given its backward stroke and the parts returned to the position shown in Fig. 13 the pawl T' will carry the shaft G' with the sleeve N' and thereby give it a second half revolution in the same direction in which it had been turned by the pawl P'; and thus at each forward and backward stroke of the rack H' the shaft G' will be given a complete revolution, and will continue to revolve in the same direction during subsequent reciprocations of the rack H'.

The rock shaft I' which carries the rack H' forms part of what may be called the vibrating frame, consisting of said shaft, three forwardly extending arms Z' fast thereon, one at either end and one at the middle, and a cross bar $A^2$ connecting the front ends of the arms Z' and extending across the entire series of key levers.

Figures 4, 9:
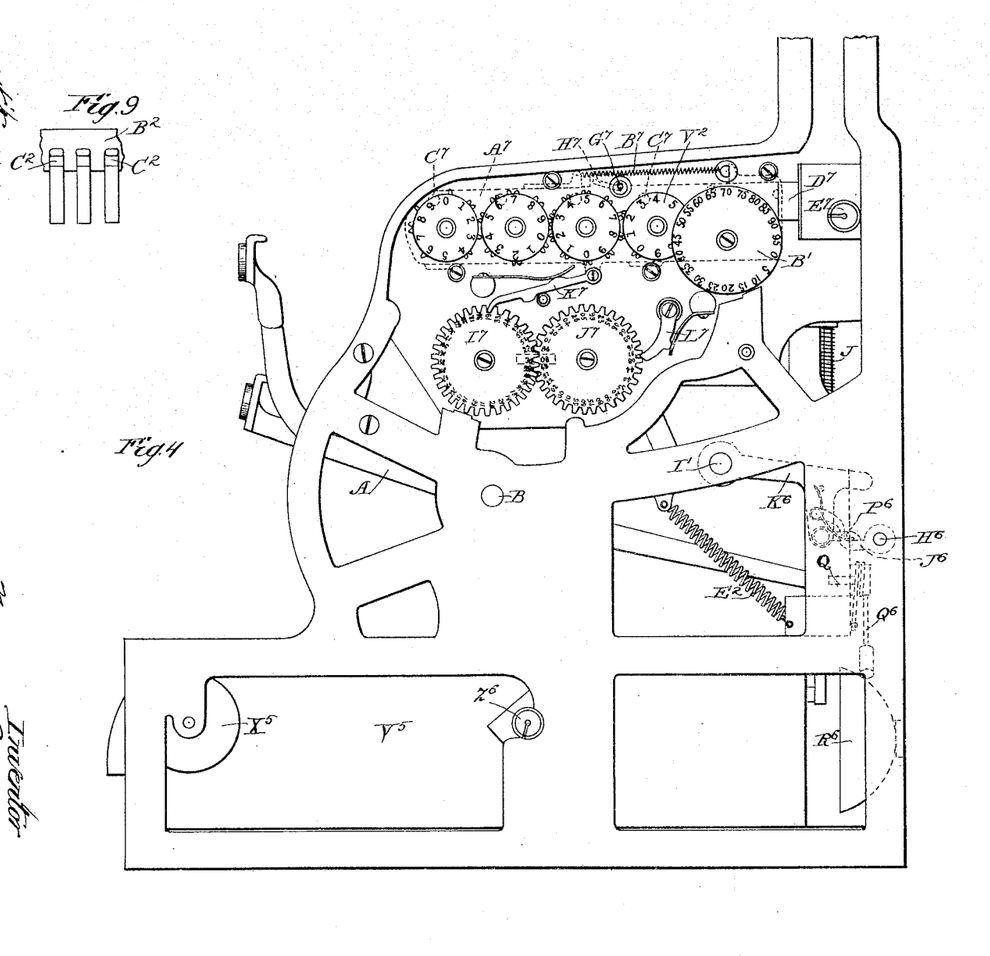
Fig. 4 an elevation of the right side of the machine.
Fig. 9, Sheet 4, a detail of the forward side of the vibrating frame and slotted plate secured thereto.
Figures 7, 10:
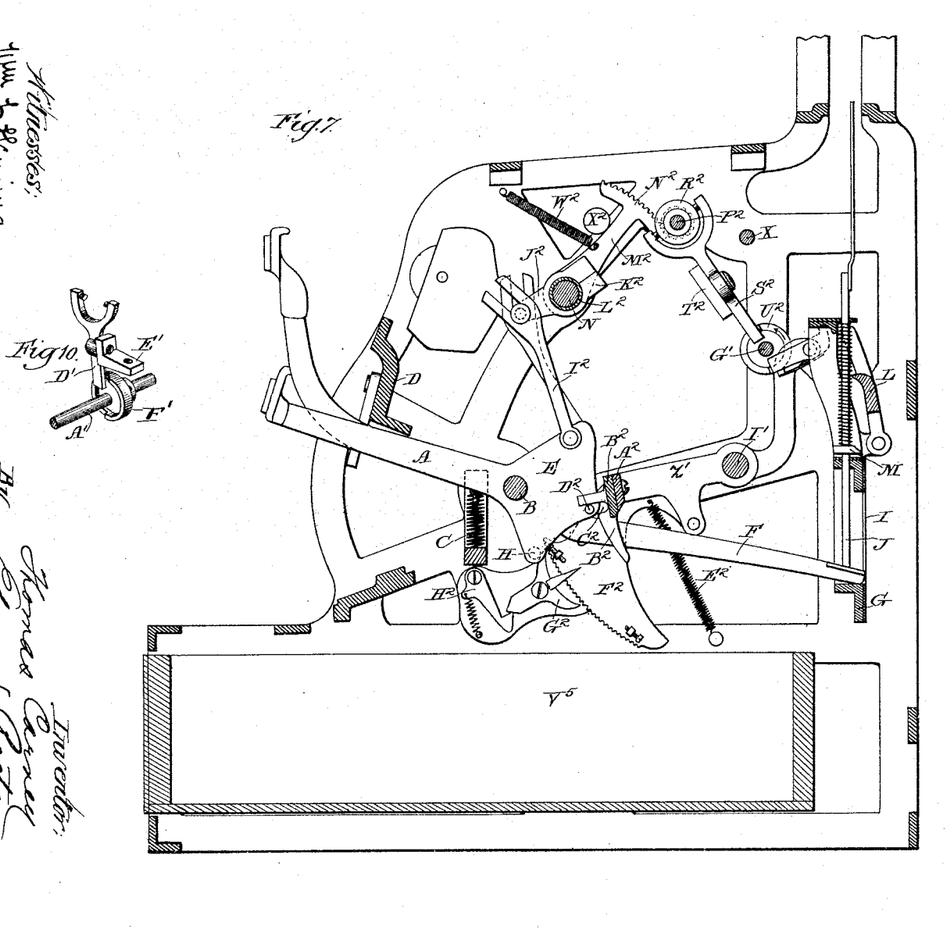
Fig. 7 a vertical section on the line 7—7 of Fig. 3.
Fig. 10 a detail of one of the cams for operating the clutch shifter.
Figure 18:
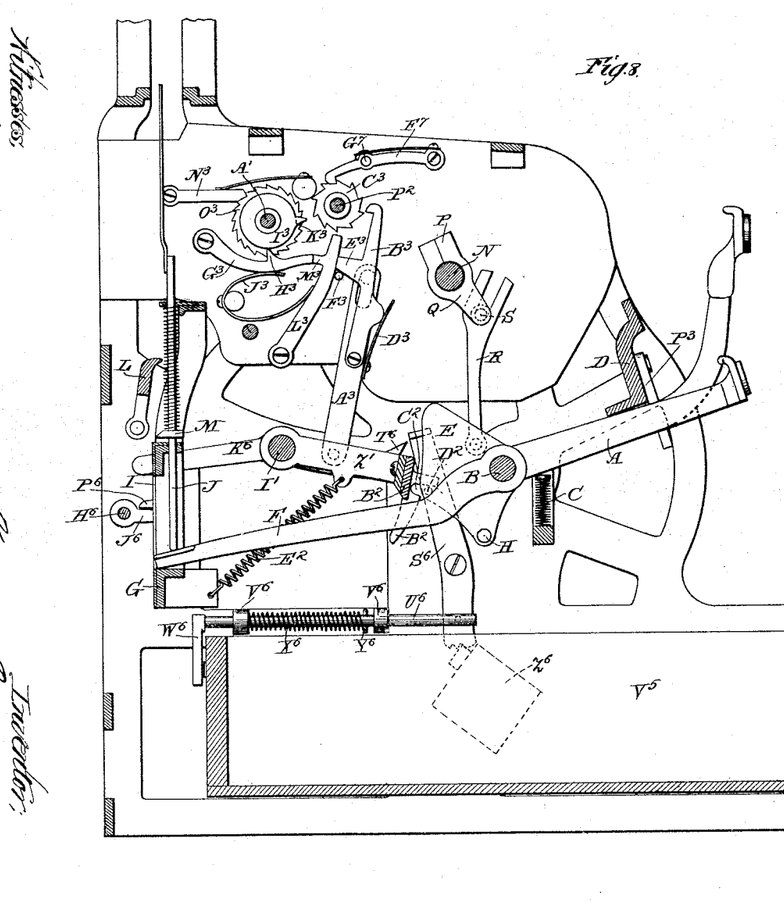

Secured upon the forward side of the bar $A^2$ is a plate $B^2$, of the shape in cross section shown in Figs. 6, 7 and 8. This plate is slotted vertically, as seen in Fig. 9, one slot standing in line with and embracing each key lever plate E and adjacent lever F. The plate $B^2$ is also provided with a longitudinal slot $C^2$ extending rearward from its forward side near its upper edge, and the forwardly projecting pins thus formed upon the plate overlie and rest upon pins $D^2$ upon the sides of the plates E. When the front end of any key lever A is given a downward stroke the pin $D^2$ upon its plate E will lift the plate $B^2$ and forward side of the whole vibrating frame and rock the shaft I', and give the rack H' a backward stroke. When the operated key is released springs $E^2$ connected to the side arms Z' of the frame, Figs. 4, 6 and 7, will restore it to normal position. When the front end of a key lever is depressed the pin $D^2$ on its plate E not only lifts the vibrating frame but enters and becomes confined in the slot $C^2$ in the plate $B^2$, so that the key and plate move together until they are returned to normal position.

Secured upon the left hand side of the vibrating frame and depending therefrom is a toothed segment $F^2$ which co-operates with a double toothed pawl $G^2$ to insure a full stroke of the segment and frame in each direction, a spring latch $H^2$ co-operating with the pawl $G^2$ in the usual manner. Inasmuch as each key lever becomes coupled to the vibrating frame by means of its pin $D^2$ and the slot in the plate $B^2$ as soon as the key is depressed from normal position it will be seen that this device for compelling a full movement of the vibrating frame in each direction will also compel a full stroke of any operated key in each direction and thereby insure a registration of its full value. The forward side of the depending portion of the plate $B^2$ is curved in the arc of a circle substantially concentric to the shaft I' and when the forward side of the vibrating frame is lifted by the operation of any key lever the forward side of the depending portion of the plate $B^2$ will travel upward immediately in rear of and over the pins $D^2$ of all the key levers which remain at rest and will thereby lock them from operation until the operated key and the vibrating frame have been re-set to normal position.

The plates E of the five key levers A at the left, representing dollars, are connected by links $I^2$, Fig. 7, with arms $J^2$ carried by split hubs $K^2$ clamped upon a sleeve $L^2$, Fig. 3, loose upon the shaft N near its left hand end. This sleeve has fast upon it an arm $M^2$ which carries a segmental rack $N^2$ meshing with a pinion $O^2$ loose upon a shaft $P^2$ extending across the entire machine and journaled at its opposite ends in the framework.

Fast upon the right hand side of the pinion $O^2$ is a clutch member $Q^2$ adapted to co-operate with a sliding clutch member $R^2$ mounted upon the shaft $P^2$ and connected therewith by a slot and pin so as to turn with the shaft. The two clutch members are yieldingly held apart by a coiled spring interposed between them around the shaft $P^2$, and the sliding member is moved into engagement with the one carried by the pinion by a shifter $S^2$, Fig. 7, pivoted near its middle to a plate $T^2$ projecting inward from the side frame of the machine. The upper forward end of this shifter is forked and provided with pins engaging a circumferential groove in the clutch member $R^2$, and its lower end co-operates with a cam $U^2$ similar to the cam F' before described and fast upon the same revoluble shaft G'.

The extreme right hand end of the shaft $P^2$ has fast upon it, outside the frame, a second wheel $V^2$ of the train of registering wheels, Fig. 4. This wheel represents units of dollars and bears the nine digits and a cipher, and is turned one number at each complete revolution of the primary wheel B' in the manner and by the means hereinafter described. The clutch $R^2$, Fig. 3, is slid to the left by the shifter $S^2$, and engaged with the clutch $Q^2$, at the beginning of the positive stroke of any one of the dollar key levers, and the adjustment of the parts is such that the full downward stroke of any one of said levers will cause the rack $N^2$ to turn the shaft $P^2$ and registering wheel $V^2$ just far enough to add upon the latter the full value of the operated lever. When the lever is released a spring $W^2$, Fig. 7, will restore the rack to normal position, its upward movement being limited by a stop $X^2$, a similar spring and stop also co-operating with the rack V heretofore described.

The devices by which the complete revolutions of the primary registering wheel B' are added upon the secondary wheel $V^2$ may be now described, reference being had to Figs. 3 and 8.

Pivoted to the right hand side plate Z' of the vibrating frame, Fig. 8, is a plate $A^3$ provided at its upper end with a slot which embraces a pin upon the side plate of the framework. Pivoted to the plate $A^3$ is a hooked pawl arm $B^3$ adapted to co-operate with a ratchet $C^3$ fast upon the shaft $P^2$ which carries the secondary registering wheel $V^2$, a spring $D^3$ secured to the plate $A^3$ bearing against the pawl arm and tending to press it into engagement with the ratchet. Upon the rear side of the pawl arm is a projection $E^3$ having a beveled under side which rests upon a pin $F^3$ projecting from the side of the frame. The engagement of the projection $E^3$ with the pin $F^3$ holds the pawl $B^3$ out of engagement with the ratchet $C^3$ when the vibrating frame is in its normal position of rest, but whenever any one of the key levers was operated and the vibrating frame and plate lifted thereby the spring $D^3$ would throw the pawl $B^3$ into engagement with the ratchet as soon as the projection $E^3$ was lifted away from the pin $F^3$, but for the provision of a latch which holds the pawl $B^3$ away from the ratchet $C^3$ except when the latch has been tripped by a complete revolution of the primary registering wheel. This latch consists of an arm $G^3$ pivoted at its rear end to the side plate of the frame. Upon its upper side near its middle this arm is provided with a projection $H^3$ which bears against the periphery of a disk $I^3$ fast upon the shaft A' which carries the primary registering wheel. A curved spring $J^3$ bearing against the under side of the latch arm $G^3$ presses it against the disk. The disk is provided with a cam projection $K^3$ which is adapted to depress the latch arm $G^3$ as it rides over the projection $H^3$ thereon, and this it does at the completion of each revolution of the shaft H' and primary registering wheel.

Interposed between the front end of the latch arm $G^3$ and the rear end of the projection $E^3$ on the pawl arm $B^3$ is an arm $L^3$ pivoted at its lower end to the side plate of the frame. This arm $L^3$ has upon its rear side near its upper end a lug $M^3$ with which the front end of the latch arm $G^3$ is normally engaged. It results from this construction that whenever the vibrating frame is lifted by the operation of one of the key levers the rear end of the projection $E^3$ will travel upward upon the forward side of the arm $L^3$ and the pawl $B^3$ will be thereby held by it out of engagement with the ratchet $C^3$ of the secondary registering wheel. When, however, the operation of any key turns the primary wheel until the cam $K^3$ on the disk $I^3$ rides over the projection $H^3$ and depresses the latch arm $G^3$ the front end of the latter will be carried below the lug $M^3$ on the arm $L^3$, and as the vibrating frame and parts carried thereby have been lifted by such operation of the key the projection $E^3$ will be clear of the pin $F^3$ and the spring $D^3$ will force the pawl arm $B^3$ rearward and engage its hooked upper end with the ratchet $C^3$. When the operated key is then released and the vibrating frame drops back to normal position the pawl arm will turn the ratchet $C^3$ and secondary registering wheel one notch and number and then be disengaged from the ratchet by the re-engagement of the projection $E^3$ with the pin $F^3$. The lower forward end of the curved spring $J^3$ bears against the rear side of the arm $L^3$. This spring is weaker than the spring $D^3$ which presses the pawl arm $B^3$ rearward, so that when the latch arm $G^3$ has been depressed and its forward end disengaged from the lug $M^3$ the pressure of the spring $D^3$ will overcome the resistance offered by the spring $J^3$ and force the pawl arm $B^3$ and arm $L^3$ rearward, as before described. When the parts have been returned to normal position and the engagement of the projection $E^3$ with the pin $F^3$ has forced the pawl arm $B^3$ forward to normal position again the spring $J^3$ is free to throw the arm $L^3$ forward against the rear end of the projection $E^3$, thereby disengaging its lug $M^3$ from the end of the latch arm $G^3$, which latter will then be thrown upward by the opposite end of the spring $J^3$, and all of the parts will resume the positions shown in the drawings. In this manner the secondary registering wheel is turned one number at each complete revolution of the primary wheel, and the transfer is effected during the return or non-registering strokes of the operated keys, so that if a dollar key and a cent key be operated simultaneously the two registering wheels will be turned under the impulse of their respective keys, and if the movement of the primary wheel should cause it to complete a revolution the transfer pawl will be set to turn the secondary wheel one number upon the return strokes of the parts. The proper transfer from the primary to the secondary wheel is thus always effected when a key in the cents set and a key in the dollars set are operated simultaneously, regardless of the position in which the primary wheel may have been left by the last operation of the machine. A pawl $N^3$ pivoted to the framework and spring pressed into engagement with a ratchet $O^3$ fast on the shaft $A'$ prevents backward movement of the primary registering wheel.

Inasmuch as all the keys of the cents series act upon the single primary wheel $B'$ the keys in said set must be operated singly, for if two or more be operated at once only the value of the highest one will be added upon the wheel. For the purpose of positively preventing simultaneous operation of two or more keys in the set I provide a series of locking hangers $P^3$, Figs. 1, 6 and 8, pivoted at their upper ends to the forward sides of the cross plate D of the framework and depending between the keys. The lower ends of these hangers are free to swing laterally, and whenever the front end of any key lever is depressed it pushes the adjacent hangers aside and passes between them, but if it be attempted to depress two of the levers at once they will become locked against the intermediate hangers, as will be readily understood. The set of dollar keys co-operates with a similar series of hangers $Q^3$ to prevent simultaneous operation of two or more of the dollar keys, all of which act on the secondary registering wheel $V^2$.

Having now described the operation of the registering and indicating mechanisms, by which when any key lever is operated an indicator representing its value is thrown into view and a corresponding amount added upon the registering wheels, it will next be in order to describe the printing mechanisms, by which the value of each key operated, or of a dollar and cent key simultaneously operated, is printed upon a paper strip carried in the machine, and also upon a paper check or ticket temporarily inserted in the machine, if desired.

Upon reference to Figs. 3 and 6 of the drawings it will be remembered that the segmental rack V, which is moved different degrees by the operations of the different keys of the cent series, meshes with a pinion W which is fast upon a shaft X. Now, this pinion and shaft move forward and backward with the rack V, being coupled to the primary registering wheel during their movement in one direction and being independent thereof during their movement in the opposite direction.

Figures 5, 11, 12:
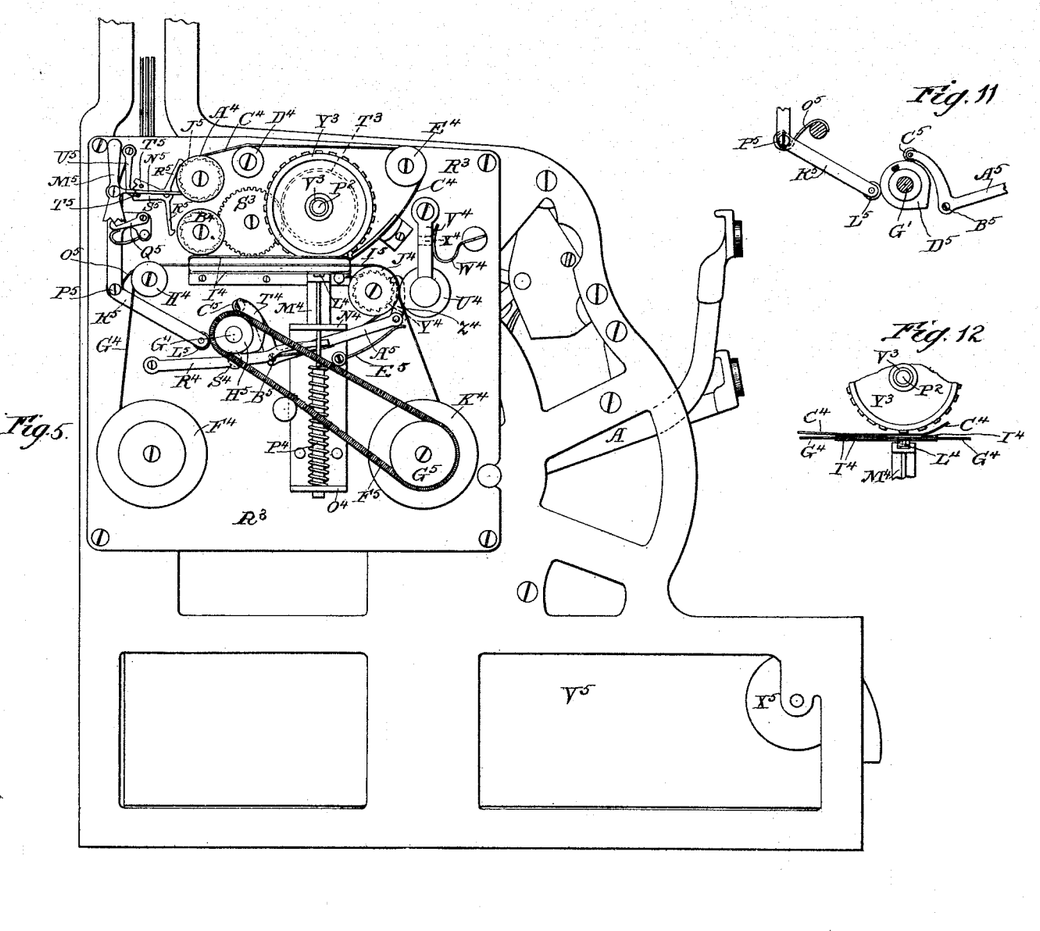
Fig. 5 an elevation of the left side thereof.
Fig. 11, Sheet 5, a detail of one of the cams on the revoluble shaft and parts actuated thereby.
Fig. 12 a detail of one of the typewheels and associated parts.

Fast upon the extreme left hand end of the shaft X, outside the left hand side frame of the machine and a supplemental supporting plate $R^3$ secured thereon, is a gear wheel $S^3$ which meshes with a second gear wheel $T^3$ fast upon a sleeve $U^3$ loosely mounted upon the sleeve $V^3$ Fig. 5, which carries the pinion $O^2$ meshing with the rack $N^2$ actuated by the keys of the dollar series, as before explained, the sleeve $V^3$ being loosely mounted upon the shaft $P^2$. The sleeve $U^3$ which carries the gear $T^3$ has fast upon it a type wheel $W^3$ bearing upon its periphery nineteen type numbers representing multiples of five, from 5 to 95, and the adjustment of the parts is such that whenever any one of the key levers in the cents series is given its full positive stroke the type wheel $W^3$ will be turned until its number representing the value of such key is brought to the printing point hereinafter described.

Fast upon the outer end of the sleeve $V^3$ which carries the pinion $O^2$ actuated by the keys of the dollar series is a second type wheel $Y^3$ bearing upon a portion of its periphery a series of type numbers representing the values of the dollar keys, the adjustment of the parts being such that whenever any key lever in the dollar series is given a full positive stroke the type wheel $Y^3$ will be turned until its number representing the value of such key is also brought to the printing point.

Wound at its opposite ends upon two spools $A^4$ $B^4$, Fig. 5, is an inking ribbon $C^4$ which is led from the upper spool $A^4$ over a roller $D^4$, thence over the two type wheels and around a second roller $E^4$, thence downward and rearward beneath the type-wheels, and thence to the lower spool $B^4$.

Carried upon a supply reel $F^4$ is a paper strip or ribbon $G^4$, which is led upward over a guide roller $H^4$, thence forward between guide plates $I^4$ secured to and projecting from the side of the plate $R^3$, beneath the type-wheels, thence over a second guide roller $J^4$, and thence down around a storage reel $K^4$. The guide plates $I^4$ have co-incident openings in them immediately below the two type-wheels, Fig. 12, so that the paper strip is exposed to said wheels at that point and may be forced upward against them by an impression platen operating through the openings in the plates. This platen $L^4$ is carried upon a reciprocating support $M^4$ mounted in upper and lower guide plates $N^4$ $O^4$. A spring $P^4$ surrounding the lower rod portion of the support $M^4$ and confined between the lower guide plate $O^4$ and a shoulder on the support $M^4$ at $Q^4$ presses the support upward and tends to force the platen $L^4$ against the type-wheels. The platen support $M^4$ is slotted beneath the upper guide plate $N^4$, Fig. 1, and has passed through it the front end of a lever $R^4$ pivoted at its rear end to the plate $R^3$. A friction roller $S^4$ carried upon the inner side of this lever $R^4$, near its middle, co-operates with a snail cam $T^4$ fast upon the left hand end of the shaft $G'$, Fig. 3, which shaft, it will be remembered, is given a complete revolution at each operation of the machine, one half by the positive stroke of the operated key and one half during the return stroke of the key. The position of the cam $T^4$ upon this shaft is such that during the positive stroke of an operated key it will ride over the friction roller $S^4$ and depress the forward end of the lever $R^4$, which latter will carry the platen support $M^4$ downward with it and compress the spring $P^4$. Just at the completion of the stroke of the operated key the tail of the cam will clear the roller $S^4$, whereupon the spring $P^4$ will throw up the platen support $M^4$ and cause the platen support $L^4$ to force the paper strip $G^4$ against the types $w$ which have been brought to the printing point by the operation of the key, and thereby imprint upon said strip the value of said key. During the return stroke of the operated key the shaft $G'$ completes its revolution and carries the cam $T^4$ back to the position shown in the drawings.

The roller $J^4$ heretofore referred to serves as one of a pair of feed rollers for advancing the paper strip, the other roller of the pair, $U^4$, being carried in hangers $V^4$ hung at their upper ends to a support projecting from the plate $R^3$. A curved spring $W^4$, bearing against a cross bar $X^4$ connecting the two hangers $V^4$, Fig. 1, presses the roller $U^4$ against the roller $J^4$. The roller $J^4$ has a ratchet $Y^4$, dotted lines Fig. 5, fast upon its inner end adjacent to the plate $R^3$. This ratchet and the roller are intermittently turned by a hooked pawl $Z^4$ carried by the forward end of a bent lever $A^5$ pivoted to the side of the plate $R^3$ at $B^5$. The upper rear end of this bent lever carries a friction roller $C^5$, which co-operates with a second cam $D^5$, Fig. 11, fast upon the revoluble shaft $G'$ heretofore described. A spring $E^5$ bearing against the under side of the forward end of the lever $A^5$ presses the latter upward and holds the friction roller at its rear end in engagement with the cam $D^5$. At each operation of the machine and complete revolution of the shaft $G'$ the cam $D^5$ will force the upper rear end of the lever $A^5$ forward and throw its front end downward, causing the pawl $Z^4$ to turn the feed roller $J^4$ and advance the paper strip. The position of the cam $D^5$ on the shaft $G'$ is such that the lever $A^5$ is actuated to turn the roller $J^4$, and thus advance the paper strip, during the second half of the revolution of the shaft $G'$ and return stroke of the operated key, so that after the key has been given its full positive stroke and its value has been printed upon the paper strip the latter is advanced to bring a fresh portion of said strip to the printing point, ready for the next operation of the machine.

The storage reel $K^4$ is actuated at each operation of the machine, to wind up the portion of the paper strip which is drawn forward by the feed rollers $J^4$ $U^4$, by a connection with the revoluble shaft $G'$, consisting of a yielding band $F^5$ passed around a curved disk or pulley $G^5$ fast on the storage reel and a second one $H^5$ fast upon the shaft $G'$. This yielding connnection of the storage reel with the driving shaft $G'$ is such that the storage reel will be turned at each operation of the machine to wind up the portion of the paper strip which is fed to it by the feed rollers $J^4$ $U^4$, but when this portion of the strip has been wound up the resistance offered to the farther forward movement of the strip will be sufficient to overcome the friction of the driving connection upon the pulley $H^5$ so that the latter will turn without transmitting movement to the storage reel. In this manner the storage reel is caused to wind up at each operation of the machine just the portion of the strip advanced to it by the feed rollers, and as this portion is always the same the feeding of the strip will be uniform, and the numbers will be printed upon it at equal distances, regardless of the quantity of the strip which may be wound upon the storage reel.

A friction spring $I^5$ bearing against the upper side of the ratchet $Y^4$ on the feed roller $J^4$ prevents forward movement of the latter excepting under the action of the pawl $Z^3$ before described.

Each of the spools $A^4$ $B^4$, which carry the inking ribbon $C^4$, has fast upon its inner end, adjacent to the plate $R^3$, a ratchet $J^5$, dotted lines Fig. 5. A bent lever $K^5$ pivoted to the plate $R^3$ at its angle carries at its lower forward end a friction roller $L^5$, which co-operates with the cam $D^5$ on the shaft $G'$, heretofore described.

Pivoted to the upper end of the lever $K^5$ is a vertical plate $M^5$ which carries a pawl $N^5$ projecting at right angles therefrom into position to alternately engage the ratchets $J^5$ of the spools $A^4$ $B^4$. A spring $O^5$ coiled around a stud or screw $P^5$ on which the lever $K^5$ is hung, Fig. 2, and bearing at one end against the under side of the forwardly extending arm of said lever and at its other end against the shaft which supports the roller $H^4$, presses the forward end of said lever upward and holds the friction roller $L^5$ in engagement with the cam $D^5$ on the shaft $G'$. At each operation of the machine and revolution of the shaft $G'$ the cam $D^5$ will force the front end of the lever $K^5$ downward and throw its upper end forward and cause the pawl $N^5$ to turn the ratchet of the spool with which it is engaged.

The lower end of the plate $M^5$ which carries the pawl $N^5$ is notched and co-operates with a spring latch $Q^5$. The upper end of the plate $M^5$ serves as a handle by which the plate may be rocked on its pivot to disengage the pawl $N^5$ from the ratchet of one spool and engage it with the ratchet of the other, the latch $Q^5$ serving to hold the plate in either position to which it may be moved. Holding pawls $R^5$ carried by a bell crank plate $S^5$ also co-operate with the ratchets $J^5$. The rear end of the plate $S^5$ has upon it two pins $T^5$ embracing the pawl $N^5$, and is also notched like the lower end of the plate $M^5$ and has co-operating with it a spring latch $U^5$ similar to the latch $Q^5$. When the plate $M^5$ is swung into position to engage the pawl $N^5$ with one of the ratchets $J^5$ the pawl will rock the bell crank plate $S^5$ into position to engage one of its pawls $R^5$ with the same ratchet $J^5$, and the spring latch $U^5$ will hold the plate in such position until the plate $M^5$ has swung into position to disengage the pawl $N^5$ from said ratchet and engage it with the other one, whereupon the plate $S^5$ will be so moved that its opposite pawl $R^5$ will be engaged with such second ratchet $J^5$.

Located in the lower portion of the machine is the usual money drawer $V^5$ adapted to be moved in and out. As seen in Fig. 2 the sides of the drawer have secured to their upper edges flanges or angle plates $W^5$, which rest and travel upon rollers $X^5$ journaled upon the frame. The rear side of the drawer has secured upon it a plate $Y^5$ whose right-angular lower end $Z^5$ is slotted to embrace a guide rod $A^6$ mounted at its opposite ends in brackets $B^6$ supported upon the bottom of the framework, Fig. 6. The plate $Y^5$ also carries friction rollers $C^6$ being against opposite sides of the guide rod $A^6$. In this manner the drawer is guided truly in its forward and backward movements and the friction occasioned thereby reduced to a minimum.

Projecting from the rear side of the drawer near its upper edge is a locking plate $D^6$, which may be integral with the plate $Y^5$, and with which co-operates a hook $E^6$ to which is pivoted the lower end of a link $F^6$ whose upper end is pivoted to an ear or arm $G^6$ fast upon a rock shaft $H^6$, Fig. 2. This rock shaft is journaled at its right hand end, in said figure, in the upper end of a standard $I^6$ and at its left hand end in a bearing upon the side frame of the machine. Near its left hand end it has fast upon it a forwardly projecting arm $J^6$, Fig. 8, with which co-operates the rear end of an arm $K^6$ fast upon the rock shaft $I'$ of the vibrating frame. Whenever one of the key levers is given its full positive stroke and the forward side of the vibrating frame lifted thereby the rear end of the arm $K^6$ will engage the arm $J^6$ and rock the shaft $H^6$ and depress the hook $E^6$, Fig. 6, and release the drawer, which will then be thrown open by the action of a suitable spring, as $L^6$, which need not be described in detail. A spring $M^6$, Fig. 2, coiled around the right hand end of the shaft $H^6$ and secured at one end in the standard $I^6$ and at its opposite end in a collar $N^6$ fast on the shaft $H^6$ tends to rock the shaft rearward and lift the hook $E^6$ and hold it in engagement with the locking plate on the drawer, the movement of the shaft in this direction under the stress of the spring being limited by a stop $O^6$ secured upon the rear side of the guide plate I.

The rear depending portion of the arm $K^6$, Fig. 4, carries a trip $P^6$, which co-operates with a spring hammer $Q^6$, Fig. 2, to sound a gong $R^6$ at each operation of the machine.

For the purpose of preventing operation of the machine excepting when the money drawer is closed and locked I provide a lever $S^6$, Fig. 8, pivoted to the side frame of the machine, and having its upper end bent inwardly into position to catch over a projection $T^6$ on the vibrating frame whenever the upper end of the lever is swung rearward. The lower end of the lever has pivoted to it the front end of a rod $U^6$ carried in guides $V^6$ and provided at its rear end with a depending plate $W^6$ extending down behind the drawer. The rod $U^6$ and lower end of the lever $S^6$ are pressed forward by the spring $X^6$ coiled around the rod $U^6$ between the rear guide $V^6$ and a pin $Y^6$ passed through the rod. When the drawer is pushed in and locked the engagement of its rear end with the plate $W^6$ will hold the rod and lever $S^6$ in the position shown in Fig. 8, with the upper bent end of the lever out of the path of travel of the projection $T^6$ of the vibrating frame. Whenever any key lever is operated, however, and the drawer released and thrown open, the spring $X^6$ will force the rod $U^6$ forward and throw the upper end of the lever $S^6$ rearward. When the operated key is then released and the vibrating frame drops back to normal position the beveled forward side of the projection $T^6$ will engage the bent end of the lever and force it slightly forward as it passes downward by it and the end of the lever will then catch over the projection and prevent the vibrating frame being lifted again until the money drawer is closed and the lever swung back to the position shown in the drawings. In this manner as soon as any lever has been operated and released and the parts restored to normal position the vibrating frame becomes locked and prevents further operation of any of the keys until the drawer is closed.

The lower end of the lever $S^6$ is adapted to co-operate with the bolt of a lock $Z^6$ secured upon the inner face of the side frame of the machine, Fig. 4, and controllable by a key from the exterior of the casing. When the bolt of this lock is thrown outward, as indicated by the dotted lines in Fig. 8, it will hold the lever $S^6$ in the position there shown even when the money drawer is released and thrown open, so that by means of this lock the automatic lock for preventing operation of the machine while the drawer stands open may be thrown and maintained out of operation at any time desired.

The secondary registering wheel, $V^4$, adds its revolutions upon a third registering wheel, representing tens of dollars, the third upon a fourth, representing hundreds of dollars, and the fourth upon a fifth, representing thousands of dollars, in the usual or any suitable manner. These registering wheels are covered by a sliding screen plate $A^7$, shown in dotted lines in Fig. 4. A spring $B^7$ pulls the plate toward the right and tends to move it into position for the numbers at the upper sides of the registering wheels to be exposed through openings $C^7$ in the plate, but the plate is normally held to the left, in the position shown in the drawings, by the bolt $D^7$ of a lock $E^7$ controlled by a key from the exterior of the casing. When the bolt $D^7$ is thrown to the right the spring $B^7$ will pull the screen plate $A^7$ in that direction and expose the registry on the wheels through the openings $C^7$ in said plate, and after the registry has been taken, and the wheels re-set to zero if desired, the bolt of the lock is thrown out again and the screen plate moved to the left to hide the numbers upon the wheels. By retaining possession of the key of the lock E⁷ the proprietor may prevent any inspection of the register by the clerk or other unauthorized person. A hooked holding pawl F⁷, Fig. 8, spring pressed into engagement with the ratchet C⁷ which is fast on the shaft P² which carries the second registering wheel V², prevents backward movement of said shaft and wheel, and this pawl is provided with a pin G⁷ projecting laterally through the side plate which carries the registering wheels and through an inclined slot H⁷ in the screen plate A⁷, Fig. 4. When the screen plate is thrown to the right by the spring the inclined slot H⁷ will lift the pin G⁷ and disengage the pawl F⁷ from the ratchet C³.

The side of the casing of the machine, which incloses the framework shown in the drawings, is provided with a series of openings over the reading points of each of the registering wheels so that when the screen plate is thrown to the right by the spring the numbers upon the wheels may be seen through these openings in the casing and the openings C⁷ in the screen plate.

For the purpose of preserving a record of the operations of the lock E⁷, or movements of the screen plate, and thereby to enable the proprietor to know whether the register has been surreptitiously inspected, I provide a novel indicating device which is actuated, to change its indications, by the movements of the screen plate and locking bolt. Mounted upon the plate which supports the registering wheels, below the latter, are two intermeshing gear wheels I⁷ J⁷. Pivoted to the lower edge of the plate A⁷ near its middle is a pawl K⁷ spring-pressed into engagement with the gear, I⁷. When the bolt of the lock is thrown to the right and the screen plate moved in that direction by the spring B⁷ the pawl K⁷ will be carried backward over a tooth of the gear I⁷, and when the screen plate is thrown to the left again the pawl will turn said gear the space of one tooth. A holding pawl L⁷ spring-pressed into engagement with the gear J⁷ prevents backward movement of the gears. Each of the gears is provided around its edge with a series of numbers, and the two numbers which stand immediately opposite each other at any time are exposed to view through a reading opening in the side of the casing, indicated by the dotted lines. The numbers upon these gears are not arranged in arithmetical or geometrical order, but in some irregular one, and the two gears do not have the same number or teeth, the wheel I⁷ in this instance having thirty-three teeth and the wheel J⁷ thirty-two. Under this construction and arrangement a complete revolution of the gear I⁷ will not bring the same numbers opposite each other upon the two gears. Thus, with the wheels in the position shown in Fig. 4, if the wheel I⁷ be given a complete revolution the wheel J⁷ will be turned one tooth more than a complete revolution of it, and its number "48" will be brought opposite the number "30" on the wheel I⁷. At the next complete revolution of the wheel I⁷ the number "57" on the wheel J⁷ will be brought opposite the number "30" on the wheel I⁷, and so on, requiring thirty-two revolutions of the wheel I⁷ to bring again the number "08" opposite the number "30." The purpose of this arrangement is to prevent the clerk, in case he should obtain a key to the lock E⁷, from inspecting the register, and then manipulating the lock with the key until he re-set the wheels I⁷ J⁷ to the positions in which he found them and expose the same numbers to view. Thus, with the wheels in the position shown in Fig. 4, with "30—08" exposed to view through the reading opening in the side of the casing, if the clerk should operate the lock E⁷ and inspect the register he cannot throw the bolt out and restore the screen plate to normal position without turning the wheel I⁷ and carrying the numbers "30" and "08" away from the reading opening and bringing the numbers "49" and "48" into view. Having thus changed the indication upon these wheels, he cannot re-set them, to bring "30—08" into view again, without giving the wheel I⁷ thirty-two revolutions, and as it would require thirty-three operations of the lock E⁷ to produce each revolution of the wheel I⁷, it will be seen that such a manipulation of the machine is quite impracticable. It is not essential that the numbers upon the wheels I⁷ J⁷ should be arranged in irregular order where one wheel is provided with more teeth than the other, but I prefer to arrange them so, since it is more confusing to a dishonest attendant who may have tampered with the machine and be attempting to re-set the wheels to the positions in which he found them.

It will be understood that in the use of this device the proprietor will make a note of the numbers at which he leaves the two wheels whenever he operates the lock and takes the registry from the registering wheels. If when he again inspects the machine the same numbers which he has noted are not exposed to view upon the wheels I⁷ J⁷ he will know that the lock E⁷ has been operated.

Having thus fully described my invention, I claim:

1. The combination of the key levers A provided with the pins H, the co-operating levers F hung on the same pivotal support as the levers A, the indicator rods J adapted to be lifted by the levers F and provided with the collars or projections M, and the supporting bar L co-operating with the projections M, substantially as described.

2. The combination of the key levers A having the plates E provided with pins D², and the vibrating frame pivoted at its rear and carrying at its forward edge the transversely and vertically slotted plate B² co-operating with the pins D², whereby the operated key levers are coupled to the vibrating frame, substantially as described.

3. The combination of the key levers A having the plates E provided with the pins D², and the vibrating frame having at its forward edge the slotted plate B² provided with the pendent curved portion and co-operating with the pins D², whereby the operated keys are coupled to the vibrating frame and the unoperated ones are locked from movement, substantially as described.

4. The combination of the key levers A having the plates E provided with the pins D², the vibrating frame pivoted at its rear and having at its forward edge the transversely and vertically slotted plate B² co operating with the pins D², the toothed segment F² carried by the vibrating frame, the double toothed pawl G² co-operating with the segment, and the spring latch H² co-operating with the pawl, whereby the operated keys are coupled to the vibrating frame and obliged to make a complete stroke in each direction, substantially as described.

5. The combination of the key levers A having the plates E, the rock shaft N having the arms Q fast thereon, the links R connecting the plates E and arms G, the rack V carried by the rock shaft N, the pinion W meshing with the rack V, the clutch member Y turning with the pinion W, the sliding clutch member Z mounted on the shaft A' and co-operating with the member Y, the revoluble shaft G', the shifter for the clutch Z operated by a cam upon the shaft G', the vibrating frame lifted by the operation of the key levers, and means intermediate said frame and the revoluble shaft G' for converting the reciprocating movement of the frame into rotary motion in the shaft, substantially as described.

6. In a registering machine, the combination of the operating keys, a vibrating frame movable thereby, the primary registering wheel and the secondary registering wheel, a cam turning with the former and a ratchet turning with the latter, a pawl arm reciprocating with the vibrating frame and adapted to co-operate with the ratchet, and a latch co-operating with the cam, for holding the pawl out of engagement with the ratchet excepting when the latch is tripped by the cam, substantially as described.

7. The combination of the primary registering wheel B', the secondary wheel V², the ratchet C³ turning with the wheel V² and the cam disk I³ turning with the wheel B', the operating key levers, a vibrating frame lifted thereby, the pawl arm B³ carried by the frame and adapted to co-operate with the ratchet C³, the pin F³ co-operating with the projection E³ on the pawl arm, the spring D³ acting on the pawl arm, the latch arm G³ co-operating with the cam-disk I³, the arm L³ interposed between the latch G³ and projection E³ on the arm B³, and the spring J³, substantially as and for the purpose described.

8. The combination of the key levers A having the plates E, the rock shaft N, the arms Q fast thereon, the links R connecting the plates E and arms Q, the rack V carried by the shaft N, the shaft X, the pinion W fast thereon and meshing with the rack V, the type wheel W³ turning with the shaft X, and the impression platen co-operating with the type wheel, substantially as described.

9. The combination of the key levers A having the plates E, the rock shaft N, the arms Q fast thereon, the links R connecting the plates E of the cent keys with the arms Q, the rack V carried by the shaft N, the shaft X, the pinion W fast thereon and meshing with the rack V, the sleeve L² mounted on the shaft N and having fast upon it the arms J², the links I² connecting the plates E of the dollar keys with the arms J², the rack N² carried by the sleeve L², the sleeve V³ loose on the shaft P², the pinion O fast on said sleeve and meshing with the rack N², a type wheel Y³ also fast upon said sleeve, a type wheel W³ loose upon the sleeve V³ and geared to the shaft G', and an impression platen co-operating with the two type wheels, substantially as described.

10. The combination of the spools A⁴ B⁴ provided with the ratchets J⁵, the lever K⁵, the plate M⁵ pivoted thereto and carrying the pawl N⁵ co-operating with the ratchets, the spring latch Q⁵ co-operating with the notched end of the plate M⁵, and the revoluble shaft G' carrying the cam D⁵ co-operating with the lever K⁵, substantially as described.

11. The combination of the spools A⁴ B⁴, provided with the ratchets J⁵, the lever K⁵, the plate M⁵ pivoted thereto and carrying the pawl N⁵ co-operating with the ratchets, the spring latch Q⁵ co-operating with the notched end of the plate M⁵, the bell crank plate S⁵ carrying the pawls R⁵ co-operating alternately with the ratchets J⁵ and provided with the pins T⁵ embracing the pawl N⁵, the spring-latch U⁵ co-operating with the notched end of the plate S⁵, and the revoluble shaft G' carrying the cam D⁵ co-operating with the lever K⁵, substantially as described.

12. The combination of the supply reel F⁴ and storage reel K⁴ for the paper strip, the feed rollers J⁴ U⁴, the former provided with a ratchet Y⁴, the lever A⁵ carrying the pawl Z⁴ co-operating with the ratchet Y⁴, the revoluble shaft G' carrying the cam D⁵ co-operating with the lever A⁵, and the endless yielding band F⁵ passed around the disk G⁵ on the storage reel and the disk H⁵ on the shaft G', substantially as described.

13. The combination of the key levers A, the vibrating frame moved by the operation of any one of said levers, the money drawer V⁵, the lever S⁶ adapted to have its upper end thrown over the vibrating frame to lock the same from movement, the sliding rod U⁶ connected to the lower end of said lever and carrying the plate W⁶ extending behind the drawer, and the spring $X^6$ acting upon the rod $U^6$, substantially as and for the purpose described.

14. The combination of the money drawer V provided with the supporting flanges $W^5$, the rollers $X^5$, the guide rod $A^6$, and the slotted guide plate $Z^5$ and friction rollers $C^6$ carried by the drawer and co-operating with the rod $A^6$, substantially as described.

THOMAS CARNEY.

Witnesses:
J. THOMSON CROSS,
E. W. HENDINGHAUS.